T. COGSWELL.
WALL DESK.
No. 7,189. Reissued June 27, 1876.
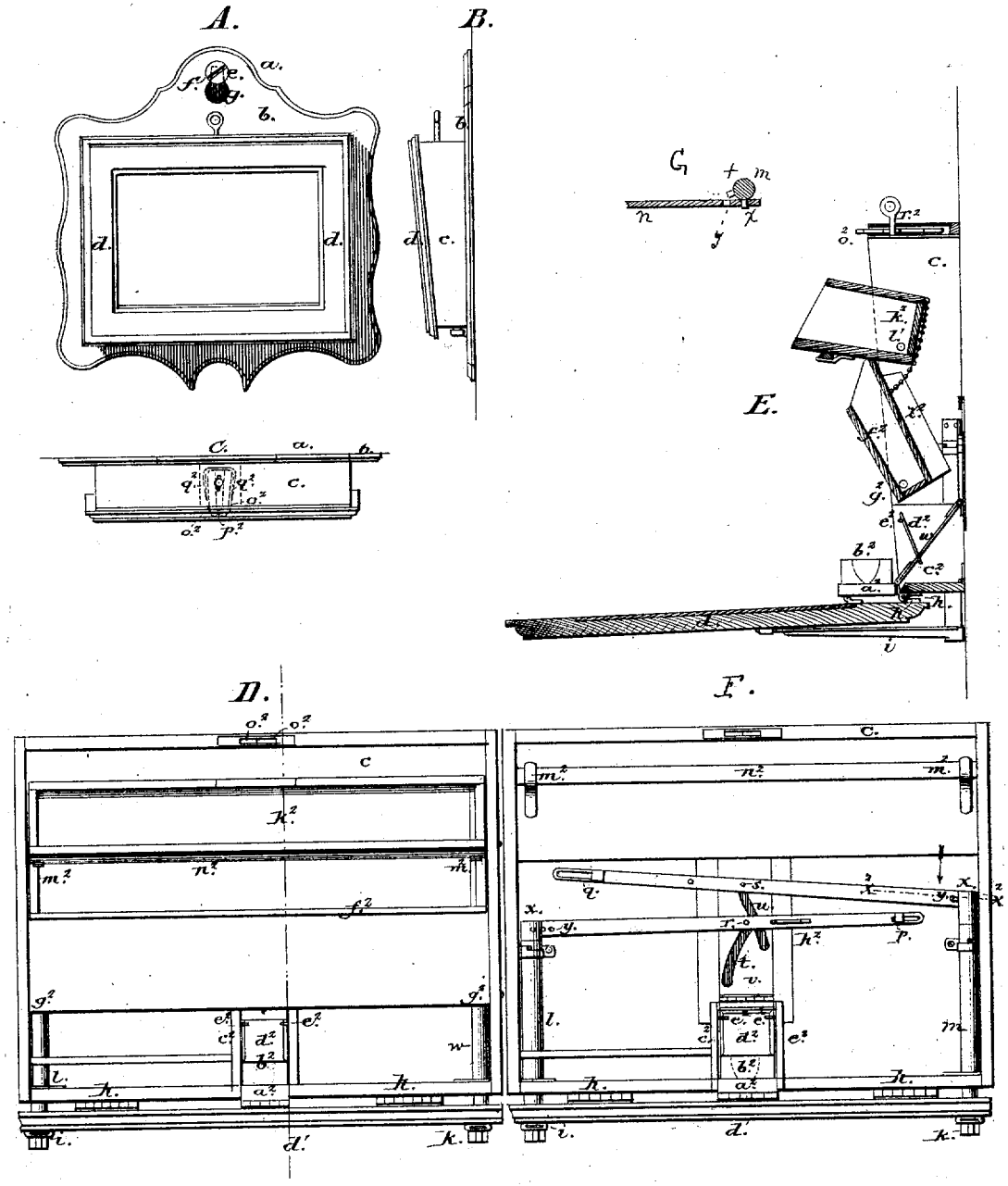
*Witnesses:*
Wm Cogswell
Alston G. Bower
*Inventor:*
Thos. Cogswell
N. PETERS, PHOTO-LITHOGRAPHER, WASHINGTON, D. C.

UNITED STATES PATENT OFFICE.

THOMAS COGSWELL, OF BOSTON, MASSACHUSETTS.

IMPROVEMENT IN WALL-DESKS.

Specification forming part of Letters Patent No. 132,632, dated October 29, 1872; reissue No. 7,189, dated June 27, 1876; application filed March 20, 1876.

*To all whom it may concern:*

Be it known that I, THOMAS COGSWELL, of Boston, Massachusetts, have invented a Wall-Desk, of which the following is a full, clear, and exact description, reference being had to the accompanying drawings, making a part of this specification, in which the drawings represent a desk embodying my construction.

The invention has reference to the construction of a desk to be hung against the vertical wall of a room; and it consists in its adaptation to the wall, and also in details of construction, as hereinafter explained.

In the drawing, A denotes a front view, B a side view, and C a plan, of the closed desk. D is a front view, and E a vertical central section, of the open desk. F is a view showing the mechanism that operates the supporting-arms. G is a detached view of the ends of the shafts *m* and levers *n*, showing the pins *x* and holes *y*.

*a* denotes the wall against which the desk is hung. *b* denotes the back, *c* the body or case, and *d* the lid, of the upright desk. The back *b* is preferably formed with one or more slots, *e*, the upper part of each of which slots is made of just the size to receive the shank of a screw-pin, *f*, screwed into the wall, and the bottom or eye *g* of which is made large enough to pass over the head of the screw, the head and slot confining the desk in position, while the eye *g* permits the desk to be hung up or removed without disturbing the screws or fastenings *f*. The lid *d* is hinged at its lower edge, as seen at *h*, and when it is swung down upon its hinges it forms a horizontal or slightly-inclined leaf or writing-desk. When thus dropped the desk is supported by two horizontal arms, *i k*, these arms extending from the bottom of two vertical rods or shafts, *l m*, which are located in the opposite rear corners of the case, each rod being supported in suitable bearings, and having a capability of rotative movement sufficient to carry its arm *i* or *k* from its desk-supporting position back ninety degrees to a position directly under the case *c* and against the back *b*. The arms *i k* necessarily stand some distance below the bottom of the case *c*, as seen at E, to support the desk, and to conceal them when the desk is closed. Each shaft *l m* is also made with provision for sliding vertically, so that when the desk is shut the shafts may not only be turned to bring the arms under the case, but may also be slid up to bring the arms up to the bottom of the case, where they will be effectually concealed by the projecting hinged edge *h* of the desk-lid.

To operate the arms automatically the two shafts are connected to the outer ends of two slide-levers, *n o*, fulcrumed at *p q*. From each lever a pin, *r* or *s*, projects into an inclined slot, *t* or *u*, made in a vertically-sliding plate, *v*, which is connected, by a jointed link or connector, *w*, to the lid *d*. As the lid is raised the slide-plate *v* rises, and the two slots *t u*, acting on the pins *r s*, slide the levers *n o* outward, causing them to turn the shafts *l m* and throw in the arms *i k*, each shaft having pins *x*, acting in holes *y*, made in the lever ends, the holes and pins operating together like cogs to turn the shafts. When the bottoms of the slots *t u* reach their pins *r s*, the plate *v* raises the levers upon their fulcrums, thereby lifting the shafts *l m* and the arms *i k*. When the desk is opened the movements are reversed, the shafts and levers falling by gravity as the slide *v* falls, and the slots *t u* throwing the levers outward, thereby turning the shafts, and throwing out the arms to receive the falling lid. Upon the lower joint $a^2$ of the connection *w* an inkstand, $b^2$, may be placed, this joint being so arranged that it always stands in a horizontal position, moving out over the desk-lid when the desk is opened, and shutting back into the case *c*, between two cheeks, $c^2$, when the desk is closed. Said inkstand may be provided with an automatic cover, $d^2$, jointed to the link *w*, and moving against pins $e^2$, the cover rising with the link, and sliding against the pins until the top of the inkstand reaches to, or nearly to, the level of the pins, and then falling over upon and closing the inkstand, the pins causing the cover to be thrown back from the instand when the lid *d* is dropped. Over the inkstand is a long box or receptacle, $f^2$, for paper, &c., said box extending from side to side of the case, and being mounted upon pins $g^2$, the box tipping to the front by the action of a pin, $h^2$, when the desk is open, and being thrown back into the case by gravity when the desk is closed.

On the back of this box may be smaller compartments $i^2$, for receiving cards, &c. Over the box $f^2$ may be hung another box or receptacle, $k^2$, for holding any articles desired, this box being hung upon pins $l^2$, and being drawn out or tipped to the front by hand or other means, and held in position by gravity, and closed by the lid or hand, and held in position by gravity when closed. In front of the box $k^2$ hooks $m^2$ may be placed for receiving a ruler, $n^2$, and various other convenient appendages for holding pens, &c., may be applied to the boxes and case. When the lid is closed it may be held in position by a lock or other suitable fastening.

The desk made and hung substantially as described occupies very little space, can be made an ornamental appendage to the wall of a room, and enables a desk to be placed in a room or office where there is no spot that can be conveniently used to receive a common desk, or where it is not desirable to have an article of furniture like a common desk.

Having thus described my invention, what I claim, and desire to secure by Letters Patent, is—

1. A wall-desk constructed and adapted to hang against a wall, substantially in the manner and for the purpose set forth.

2. In a wall-desk, substantially as described, the combination, with the hinged lid thereof, of automatically-operated supporting-arms, constructed and arranged substantially as set forth, whereby they are adapted to be lowered and swung into position to support the lid when it is lowered, and to be returned to their original position when the lid is closed.

3. The arms *i k*, shafts *l m*, slide-levers *n o*, slide-plate *v*, having the inclined slots *t u*, and pins *r s*, combined and relatively arranged, and operating, substantially as shown and described.

4. The combination, with the lid of a desk, of the connecting plate or link *w*, grooved plate *v*, levers *n o*, with their pins *r s*, shafts *l m*, and supporting-arms *i k*, adapted to be operated by the lid, substantially in the manner and for the purpose set forth.

5. In combination with the hinged lid of a desk, an inkstand so arranged with relation thereto as to be lowered and brought forward when the desk is opened, and carried back into the desk when the lid is closed, and at the same time remain in a horizontal position, substantially as described.

6. In combination with an inkstand automatically moved by the lid of a desk, an inkstand cover automatically opened by means of pins arranged as described, and closed by gravity when the lid of the desk is closed.

7. The combination, with the case of a desk, of one or more boxes or receptacles, constructed to tip outward as the case is opened, and to be shut within the case as the same is closed, substantially as described and set forth.

THOS. COGSWELL.

In presence of—
WM. COGSWELL,
ALLSTON G. BOWIE.